United States Patent
Hishinuma et al.

(10) Patent No.: US 10,815,386 B2
(45) Date of Patent: Oct. 27, 2020

(54) ACTIVE ENERGY RAY-CURABLE INK COMPOSITION FOR OFFSET PRINTING, AND METHOD OF PRODUCING PRINTED MATERIAL USING SAME

(71) Applicant: SAKATA INX CORPORATION, Osaka-shi, Osaka (JP)

(72) Inventors: Keishiro Hishinuma, Osaka (JP); Naoki Omi, Osaka (JP)

(73) Assignee: SAKATA INX CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 16/476,663

(22) PCT Filed: Jan. 11, 2018

(86) PCT No.: PCT/JP2018/000546
§ 371 (c)(1),
(2) Date: Jul. 9, 2019

(87) PCT Pub. No.: WO2018/131666
PCT Pub. Date: Jul. 19, 2018

(65) Prior Publication Data
US 2019/0359835 A1 Nov. 28, 2019

(30) Foreign Application Priority Data
Jan. 16, 2017 (JP) ................. 2017-004765

(51) Int. Cl.
| | | |
|---|---|---|
| *C08F 2/46* | (2006.01) |
| *C08F 2/50* | (2006.01) |
| *C08G 61/04* | (2006.01) |
| *C09D 11/101* | (2014.01) |
| *B41F 3/34* | (2006.01) |
| *C09D 11/033* | (2014.01) |
| *C09D 11/107* | (2014.01) |

(52) U.S. Cl.
CPC .............. *C09D 11/101* (2013.01); *B41F 3/34* (2013.01); *C09D 11/033* (2013.01); *C09D 11/107* (2013.01)

(58) Field of Classification Search
CPC ... C09D 11/101; C09D 11/033; C09D 11/107; B41F 3/34
USPC ................................... 522/182, 178, 1; 520/1
See application file for complete search history.

(56) References Cited

U.S. PATENT DOCUMENTS

| | | | | |
|---|---|---|---|---|
| 6,332,943 B1 * | 12/2001 | Herrmann | ........... | C09B 67/0084 156/277 |
| 2003/0112307 A1 | 6/2003 | Maeda et al. | | |
| 2006/0079607 A1 | 4/2006 | Balmer et al. | | |
| 2011/0092610 A1 | 4/2011 | Habashi et al. | | |
| 2011/0247508 A1 * | 10/2011 | Baptista | ................ | B41F 31/027 101/216 |
| 2012/0190765 A1 * | 7/2012 | Chopra | .................. | C09D 5/037 522/33 |
| 2019/0085111 A1 * | 3/2019 | Ohashi | .................... | C08F 18/14 |

FOREIGN PATENT DOCUMENTS

| | | |
|---|---|---|
| JP | 54118499 A | 9/1979 |
| JP | 2001123100 A | 5/2001 |
| JP | 2005015755 A | 1/2005 |
| JP | 2006206802 A | 8/2006 |
| JP | 2006249385 A | 9/2006 |
| JP | 4649952 B2 | 3/2011 |
| JP | 2012102217 A | 5/2012 |

* cited by examiner

*Primary Examiner* — Jessica Whiteley
(74) *Attorney, Agent, or Firm* — Alleman Hall Creasman & Tuttle LLP

(57) ABSTRACT

The present invention provides an active energy ray-curable ink composition for offset printing which can maintain excellent drying characteristics with a small dose of UV light. An active energy ray-curable ink composition for offset printing comprising a compound having an ethylenically unsaturated bond, a photopolymerization initiator, and an epoxidized fat or oil is used. Although epoxidized fat or oil is not polymerized through radical polymerization, the present inventors, who have conducted research, have revealed that the reactivity of a radically polymerizable ink composition is increased through addition of epoxidized fat or oil thereto.

7 Claims, No Drawings

ACTIVE ENERGY RAY-CURABLE INK COMPOSITION FOR OFFSET PRINTING, AND METHOD OF PRODUCING PRINTED MATERIAL USING SAME

TECHNICAL FIELD

The present invention relates to an active energy ray-curable ink composition for offset printing and a method of producing a printed material using the same.

BACKGROUND ART

Offset printing is a printing method using repulsion of an oily ink composition for offset printing (hereinafter, appropriately abbreviated to "ink composition" or "ink") from water. Unlike letterpress printing using a printing plate with projections and depressions, offset printing uses a printing plate having lipophilic image portions and hydrophilic non-image portions with no projections or depressions. In printing using this printing plate, dampening water is initially brought into contact with the printing plate to form a water film on the surfaces of the non-image portions, and an ink composition is fed to the printing plate. The fed ink composition then repels from the non-image portions covered with the water film, but adheres to the lipophilic image portions. An image of the ink composition is thereby formed on the surface of the printing plate, and is sequentially transferred onto a blanket and a paper sheet to complete printing.

Besides offset printing using dampening water described above, dry offset printing has practically been performed which uses a printing plate on which non-image portions of silicone resin are formed. In this printing method, an ink composition repels from the silicone resin, instead of dampening water, to form the non-image portions. Except for such features, dry offset printing is also considered a printing method having features shared with offset printing using dampening water. Accordingly, the concept represented by the term "offset printing" used herein includes not only a printing method using dampening water but also a dry printing method.

Printed materials prepared by offset printing cannot be fed to subsequent steps or be circulated as commercial products until the ink composition adhering to the surfaces of the printed materials is sufficiently dried, because an undried ink composition causes adhesion of ink onto the rear surfaces of stacked printed materials or adhesion thereof to fingers when those printed materials are touched with fingers. Accordingly, a step of drying the ink composition adhering to the surface of the printed material is needed after offset printing is performed. To accomplish such a step in a short time, printing methods using active energy ray-curable ink compositions have been intensively performed in recent years. An ink composition of this type comprises a polymerizable compound, such as a monomer or oligomer, and a polymerization initiator, which polymerizes the polymerizable compound when irradiated with active energy rays, for example, ultraviolet (UV) light or electron beams. When the undried surface of a printed material printed with this ink composition is irradiated with an active energy ray, the polymerizable compound contained therein is converted into a polymer. As a result, the ink composition present on the surface of the printed material instantaneously turns to a non-sticky (i.e., dried) coating. Ink compositions used in combination with such a drying method have been proposed (see Patent Literature 1 and 2, for example). Examples of the active energy ray used in this step include UV light and electron beams. UV light is often selected in consideration of cost and handling of the apparatus.

Activities for reducing environmental loads have been developed in a variety of industries and businesses, and such activities have been promoted also in the printing industry for a reduction in environmental loads. In such a context, in the case where UV light is used in the printing method using the active energy ray-curable ink composition described above, conventional UV lamps having high power consumption and generating ozone by short wavelength UV light are being replaced with UV LED lamps and low-output UV lamps which have lower power consumption and reduce the generation of ozone.

CITATION LIST

Patent Literature

Patent Literature 1: Japanese Patent Application Laid-Open No. 2012-102217
Patent Literature 2: Japanese Patent No. 4649952

SUMMARY OF INVENTION

Technical Problem

At the same time, such replacement of the UV lamps described above also reduces the dose of UV light impinging on the printed material during printing. In such a situation, formulation of the ink composition, such as an increase in polymerization initiator, should be examined to maintain drying characteristics of the printed material, namely, to sufficiently polymerize the polymerizable compound contained in the ink composition. Unfortunately, such examination will increase material costs for the ink composition, leading to a demand for further improvements in formulations of ink.

The present invention has been made in consideration of such circumstances. An object of the present invention is to provide an active energy ray-curable ink composition for offset printing which has excellent drying characteristics even with a reduced dose of UV light.

Solution to Problem

The present inventors, who have conducted extensive research to solve the problem above, have unexpectedly found that addition of an epoxidized fat or oil to an active energy ray-curable ink composition for offset printing comprising a compound having ethylenically unsaturated bond and a photopolymerization initiator leads to excellent drying characteristics of printed materials with a reduced dose of UV light. The present invention has been made based on this knowledge, and provides the following aspects.

The present invention is an active energy ray-curable ink composition for offset printing comprising a compound having an ethylenically unsaturated bond, a photopolymerization initiator, and an epoxidized fat or oil.

The active energy ray-curable ink composition for offset printing preferably contains the epoxidized fat or oil in an amount of 1 mass % to 50 mass % of the entire composition.

The epoxidized fat or oil is preferably epoxidized soybean oil.

The present invention also relates to a method of producing a printed material, the method comprising printing using the active energy ray-curable ink composition for offset printing.

Advantageous Effect of Invention

The present invention provides an active energy ray-curable ink composition for offset printing which can maintain excellent drying characteristics in printing situations with a small dose of UV light to be irradiated.

DESCRIPTION OF EMBODIMENTS

An embodiment of the active energy ray-curable ink composition for offset printing according to the present invention and an embodiment of the method of producing a printed material according to the present invention will now be described. These embodiments should not be construed as limitations to the present invention, and can be appropriately modified and implemented in the scope of the present invention.

<Active Energy Ray-Curable Ink Composition for Offset Printing>

The active energy ray-curable ink composition for offset printing according to the present invention is used in offset lithography, and is curable when irradiated with active energy rays, such as UV light or electron beams. As described later, the ink composition according to the present invention comprises a compound, such as a monomer or oligomer, having an ethylenically unsaturated bond and a photopolymerization initiator, and cures as a result of polymerization of the compound having ethylenically unsaturated bond by radicals generated from the photopolymerization initiator while the ink composition is being irradiated with the active energy ray. When a sticky ink composition just applied to the surface of the printed material is irradiated with the active energy rays immediately after printing, the ink composition instantaneously cures into a dried (tack-free) state.

The ink composition according to the present invention can be cured by any active energy ray which cleaves the chemical bond of the photopolymerization initiator described later to generate radicals. Examples of such active energy rays include UV light and electron beams. Among these rays, one preferred active energy ray is UV light from the viewpoint of the cost and handling of the apparatus. When UV light is used as the active energy ray, its wavelength may be appropriately determined according to the absorption wavelength of the photopolymerization initiator. For example, the wavelength is 400 nm or less. Examples of UV light irradiation devices which generate such UV light include metal halide lamps, high pressure mercury lamps, excimer lamps containing sealed noble gas, and UV light emitting diodes (LED).

The ink composition according to the present invention comprises a compound having the ethylenically unsaturated bond, a photopolymerization initiator, and an epoxidized vegetable oil. The ink composition according to the present invention may contain a coloring component (in the present invention, components which give a white or metallic color to the ink composition are also categorized in the coloring component). If the ink composition according to the present invention contains the coloring component, the ink composition can be used in applications of printing of images and letters, for example. If the ink composition according to the present invention does not contain the coloring component, the ink composition can be used in applications of coatings, for example. The ink composition according to the present invention is used not only in standard printed materials for distribution of information or those for appreciation but also a variety of printing applications provided by offset printing, such as package printing. These components will now be described.

[Compound Having Ethylenically Unsaturated Bond]

The compound having the ethylenically unsaturated bond is polymerized into a polymer by radicals generated by the photopolymerization initiator described later. This component is a so-called monomer or oligomer. A variety of polymers, which have molecular weights higher than those of the oligomers, having ethylenically unsaturated bond are also commercially available. Such a polymer can have an increased molecular weight through crosslinking with the monomer or oligomer or crosslinking of the polymer itself. Thus, such a polymer may also be used as a compound having the ethylenically unsaturated bond in addition to the monomer and the oligomer described above.

The monomer has an ethylenically unsaturated bond, and turns into a polymer through polymerization. The monomer before polymerization is usually a liquid component having a relatively low molecular weight, which is used as a solvent to dissolve a resin component to prepare a varnish or is used to adjust the viscosity of the ink composition. Examples of the monomer include monofunctional monomers having one ethylenically unsaturated bond in the molecule, and bi- or higher functional monomers having two or more ethylenically unsaturated bonds in the molecule. The bi- or higher functional monomers can crosslink molecules during curing of the ink composition, and thus contributes to acceleration of the curing rate or formation of a strong coating. While the monofunctional monomer does not have such a crosslinking ability, the monofunctional monomer contributes to a reduction in cure shrinkage accompanied by crosslinking. These types of monomers may be used in combination as needed.

Examples of the monofunctional monomers include alkyl acrylates, such as methyl (meth)acrylate, ethyl (meth)acrylate, butyl (meth)acrylate, hexyl (meth)acrylate, octyl (meth)acrylate, and dodecyl (meth)acrylate; and (meth) acrylic acid, (meth)acrylates of ethylene oxide adducts, (meth)acrylates of propylene oxide adducts, isobornyl (meth)acrylate, cyclohexyl (meth)acrylate, tricyclodecane monomethylol (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, diethylene glycol mono(meth)acrylate, triethylene glycol mono(meth)acrylate, polyethylene glycol mono(meth)acrylate, dipropylene glycol mono(meth)acrylate, polypropylene glycol mono(meth)acrylate, glycerol mono(meth)acrylate, acryloyloxyethyl phthalate, 2-(meth)acryloyloxyethyl-2-hydroxyethyl phthalate, 2-(meth)acryloyloxypropyl phthalate, β-carboxyethyl (meth)acrylate, (meth)acrylic acid dimers, ω-carboxypolycaprolactone mono(meth)acrylate, dimethylaminoethyl (meth)acrylate, diethylaminoethyl (meth)acrylate, N-vinylpyrrolidone, N-vinylformamide, and (meth)acryloylmorpholine. These monofunctional monomers may be used alone or in combination. In this specification, the term "(meth)acrylate" indicates "acrylate and/or methacrylate", and the term "(meth)acrylic acid" indicates "acrylic acid and/or methacrylic acid".

Examples of the bi- or higher functional monomers include bifunctional monomers, such as ethylene glycol di(meth)acrylate, di(ethylene glycol) di(meth)acrylate, tri(ethylene glycol) di(meth)acrylate, poly (ethylene glycol) di(meth)acrylate, propylene glycol di(meth)acrylate, di(propylene glycol) di(meth)acrylate, tri(propylene glycol) di(meth)acrylate, poly(propylene glycol) di(meth)acrylate, butylene glycol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propane diol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth) acrylate, dimethylol octane di(meth)acrylate, 2-ethyl-1,3-hexanediol di(meth)acrylate, 2,5-dimethyl-2,5-hexanediol di(meth)acrylate, 2-butyl-2-ethyl-1,3-propanediol di(meth) acrylate, 2,4-diethyl-1,5-pentanediol di(meth)acrylate, tricyclodecane dimethylol di(meth)acrylate, tricyclodecane dimethylol dicaprolactonate di(meth)acrylate, di(meth)acrylates of bisphenol A tetra(ethylene oxide) adducts, di(meth)acrylates of bisphenol F tetra(ethylene oxide) adducts, di(meth) acrylates of bisphenol S tetra(ethylene oxide) adducts, hydrogenated di(meth)acrylate of bisphenol A tetra(ethylene oxide) adducts, hydrogenated di(meth)acrylate of bisphenol F tetra(ethylene oxide) adducts, hydrogenated bisphenol A di(meth)acrylate, hydrogenated bisphenol F di(meth)acrylate, dicaprolactonate di(meth)acrylates of bisphenol A tetra(ethylene oxide) adducts, and dicaprolactonate di(meth) acrylate of bisphenol F tetra(ethylene oxide) adducts; trifunctional monomers, such as glycerol tri(meth)acrylate, trimethylolpropane tri(meth)acrylate, trimethylolpropane tricaprolactonate tri(meth)acrylate, trimethylolethane tri(meth)acrylate, trimethylolhexane tri(meth)acrylate, trimethyloloctane tri(meth)acrylate, and pentaerythritol tri(meth)acrylate; and tetra- or higher functional monomers, such as trimethylolpropane tetra(meth)acrylate, pentaerythritol tetra(meth)acrylate, pentaerythritol tetracaprolactonate tetra(meth)acrylate, diglycerol tetra(meth)acrylate, ditrimethylolpropane tetra(meth)acrylate, ditrimethylolpropane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, tripentaerythritol octa(meth)acrylate, and tripentaerythritol poly(alkylene oxide) hepta(meth)acrylate. Among these monomers, preferred are trimethylolpropane triacrylate (TMPTA; trifunctional), ditrimethylolpropane tetraacrylate (DITMPTA; tetrafunctional), dipentaerythritol hexaacrylate (DPHA; hexafunctional), glycerol propoxy triacrylate (GPTA; trifunctional), and hexanediol diacrylate (HDDA; bifunctional). These bi- or higher functional monomers may be used alone or in combination.

Examples of the monomers also include acrylates of epoxidized vegetable oils prepared through acrylic modification of epoxidized vegetable oils. These are compounds prepared by epoxidizing the double bonds of unsaturated vegetable oil with oxidizing agents, such as peracetic acid and perbenzoic acid, and adding (meth)acrylic acid to the epoxy groups of the epoxidized vegetable oil through ring-opening addition polymerization. The unsaturated vegetable oil indicates triglyceride containing at least one fatty acid having at least one carbon-carbon unsaturated bond. Examples thereof include hemp oil, flaxseed oil, perilla oil, oiticica oil, olive oil, cacao oil, kapok oil, torreya seed oil, mustard oil, apricot kernel oil, tung oil, kukui oil, walnut oil, poppy seed oil, sesame oil, safflower oil, radish seed oil, soybean oil, chaulmoogra oil, camellia oil, corn oil, rapeseed oil, niger seed oil, rice bran oil, palm oil, castor oil, sunflower oil, grape seed oil, almond oil, pine nut oil, cottonseed oil, coconut oil, peanut oil, and dehydrated castor oil. These monomers are derived from vegetable oils, and serve to increase the content of biomass components in the ink composition. A variety of commercially available acrylates of epoxidized vegetable oils may be used.

The oligomer is converted into a polymer through polymerization as described above. This component originally has a relatively high molecular weight, and is also used for the purpose of imparting appropriate viscosity and/or elasticity to the ink composition. Examples of the oligomer include epoxy-modified (meth)acrylates, such as esters of (meth) acrylic acid with epoxy compounds (such as epoxy resin) having hydroxyl groups generated through cleavage of their epoxy groups with acid or base; rosin-modified epoxy acrylates; polyester-modified (meth)acrylates, such as esters of (meth)acrylic acid with terminal hydroxyl groups of condensation polymerization products of dibasic acids and diol; polyether-modified (meth)acrylates, such as esters of (meth)acrylic acid with terminal hydroxyl groups of polyether compounds; and urethane-modified (meth)acrylates, such as esters of (meth)acrylic acid with terminal hydroxyl groups of condensates of polyisocyanate compounds and polyol compounds. Such oligomers are commercially available under trade names such as EBECRYL series available from DAICEL-CYTEC Company LTD., CN and SR series available from Sartomer Co., Inc., ARONIX M-6000, 7000, and 8000 series and ARONIX M-1100, ARONIX M-1200, and ARONIX M-1600 available from TOAGOSEI CO., LTD., and NK Oligo available from Shin Nakamura Chemical Co., Ltd. These oligomers may be used alone or in combination.

The polymer having the ethylenically unsaturated bond is polymerized with the monomer or oligomer described above to increase the molecular weight of the ink composition. This component has a large molecular weight before irradiation with active energy rays, and serves to improve the viscoelasticity of the ink composition. Such a polymer, when used, is dissolved or dispersed in a liquid monomer having low viscosity. Examples of the polymer having ethylenically unsaturated bond include poly(diallyl phthalate), acrylic resins having unreacted unsaturated groups, and acrylic-modified phenol resins. Among these polymers, poly(diallyl phthalate) can be preferably used, which has a particularly high compatibility with the monomer or oligomer described above.

The content of the compound having ethylenically unsaturated bond in the ink composition is preferably 30 to 70 mass %, more preferably 40 to 60 mass %. A content of the compound having the ethylenically unsaturated bond within this range can provide compatibility between excellent curability and excellent printability. The content of the polymer having the ethylenically unsaturated bond is preferably 0 to 50 mass %, more preferably 0 to 30 mass %, still more preferably 0 to 20 mass %. A content of the polymer within this range is preferred because it can impart appropriate viscoelasticity to the ink composition to prevent misting, and ensure excellent curability of the ink composition.

[Photopolymerization Initiator]

The photopolymerization initiator generates radicals when irradiated with active energy rays. The compound having ethylenically unsaturated bond is polymerized by the generated radicals to cure the ink composition. Any photopolymerization initiator which can generate radicals when irradiated with active energy rays can be used.

Examples of the photopolymerization initiator include benzophenone, diethylthioxanthone, 2-methyl-1-(4-methylthio)phenyl-2-morpholinopropan-1-one, 4-benzoyl-4'-methyldiphenyl sulfide, 1-chloro-4-propoxythioxanthone, isopropylthioxanthone, 2-hydroxy-2-methyl-1-phenylpropan-1-one, 1-hydroxycyclohexylphenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propan-1-one, 2,2-dimethyl-2-hydroxyacetophenone, 2,2-dimethoxy-2-phenylacetophenone, 2,4,6-trimethylbenzyl-diphenylphosphine oxide, and 2-benzyl-2-dimethylamino-1-(morpholinophenyl)-butan-1-one. Such photopolymerization initiators are commercially available under trade names, such as IRGACUREs 907, 369, 184, 379, and 819, and TPO available from BASF SE, and DETX available from Lamberti S.p.A. These photopolymerization initiators may be used alone or in combination.

The content of the photopolymerization initiator in the ink composition is preferably 1 to 20 mass %, more preferably 2 to 15 mass %, still more preferably 2 to 13 mass %, for example. A content of the photopolymerization initiator in the ink composition within this range is preferred because it can provide compatibility among sufficient curability of the ink composition, excellent inner curability, and cost. In the ink composition according to the present invention, the content of the photopolymerization initiator can be more significantly reduced than that in conventional products because the ink composition has curability during irradiation with UV light, which is improved by the epoxidized fat or oil (described later) contained in the ink composition. For this reason, it is preferred that the amount of the photopolymerization initiator to be used be appropriately reduced in consideration of the actual printing condition.

[Epoxidized Fat or Oil]

The ink composition according to the present invention contains an epoxidized fat or oil. As already described, the inventors have found that, in printing using an active energy ray-curable ink composition, addition of an epoxidized fat or oil as a component of the composition results in excellent drying characteristics of printed materials even with a small dose of UV light. In general, the polymerization reaction of compounds having an epoxy group does not occur in a radical reaction system. In consideration of this fact, the findings by the present inventors are largely unexpected. The present invention has been made based on such findings, and the ink composition contains an epoxidized fat or oil.

The epoxidized fat or oil is an ester of fatty acid having at least one epoxy group with alcohol. Although the term "fat or oil" in general indicates the ester of fatty acid and glycerol, i.e., triglyceride, the term "fat or oil" used in the present invention indicates the ester of fatty acid and alcohol (irrespective of monool or polyol) in a broader sense. Examples of such alcohol include, but not should be limited to, alcohols having 1 to 14 carbon atoms, such as glycerol, methanol, ethanol, propanol, 2-propanol, and 2-ethylhexanol. In the case of polyhydric alcohol such as glycerol, the polyhydric alcohol is condensed with at least one fatty acid having at least one epoxy group (that is, the ester bond is formed), and may be condensed with several fatty acids having at least one epoxy group. In the latter case, these fatty acids may be each independently selected. Examples of such fat or oil include triglycerides, such as vegetable oils and animal oils, and esters of fatty acids derived from vegetable oils and animal oils with mono- or dihydric alcohols (i.e., fatty acid esters).

The epoxy group is a 3-membered cyclic ether (also called oxirane or alkylene oxide) in which an oxygen atom is bonded to two carbon atoms connected to each other. Examples of the epoxidized fat or oil include epoxidized soybean oil (ESO), epoxidized corn oil, epoxidized sunflower oil, epoxidized linseed oil, epoxidized canola oil, epoxidized rapeseed oil, epoxidized safflower oil, epoxidized tall oil, epoxidized tung oil, epoxidized fish oil, epoxidized beef tallow oil, epoxidized castor oil, epoxidized methyl stearate, epoxidized butyl stearate, epoxidized 2-ethylhexyl stearate, epoxidized stearyl stearate, 3,4-epoxycyclohexylmethyl-3,4-epoxycyclohexane carboxylate epoxidized soybean oil, epoxidized propylene glycol dioleate, epoxidized palm oil, and epoxidized fatty acid methyl ester. Among these oils, preferred are epoxidized vegetable oils, and more preferred is epoxidized soybean oil.

The epoxidized fat or oil can be prepared by a variety of processes. If the fat or oil is triglyceride, its epoxidized fat or oil is prepared through oxidation of a vegetable or animal oil having an unsaturated bond in the fatty acid moiety with an appropriate oxidizing agent or peroxide. If the fat or oil is not triglyceride, its epoxidized fat or oil is prepared as follows: A fatty acid having the unsaturated bond is esterified with alcohol (irrespective of monool or polyol), and is subjected to an ester exchange or substitution reaction into a fatty acid ester. The fatty acid ester is further oxidized with an appropriate oxidizing agent or peroxide. These processes are exemplary, and the fat or oil may be prepared by other processes. Alternatively, a commercially available epoxidized fat or oil may be used.

As described above, use of the epoxidized fat or oil is also preferred to increase the content of the biomass component in the ink composition. The compound having an ethylenically unsaturated bond, which is an essential component of the active energy ray-curable ink composition, has a high solubility parameter (SP value) and cannot be mixed with a vegetable oil having a low SP value. This feature precludes addition of a biomass component, such as vegetable oil, to the active energy ray-curable ink composition. The epoxidation of the unsaturated bond contained in the fat or oil, such as vegetable oil, can increase the SP value of the fat or oil and thus enables addition of the resulting vegetable oil to the ink composition. This is one of the advantageous effects of the present invention. The epoxidized fat or oil used in the present invention preferably has an SP value of about 9.0 to 10.0, for example.

The content of the epoxidized fat or oil in the ink composition is preferably 1 to 50 mass %, for example. A content of the epoxidized fat or oil in the ink composition within this range can provide excellent curability and gloss of printed materials. The content of the epoxidized fat or oil in the ink composition is preferably 1 to 30 mass %, more preferably 1 to 20 mass %.

[Coloring Component]

The ink composition according to the present invention may contain a coloring component as needed. The coloring component is added to impart coloring ability and/or opacity to the ink composition. Examples thereof include coloring pigments, white pigments, and metal powder. Examples of such a coloring component include, but should not be limited to, organic and/or inorganic pigments traditionally used in ink compositions. The ink composition according to the present invention not containing the coloring component is preferably used in coating applications.

Examples of the coloring component include yellow pigments, such as disazo yellows (Pigment Yellows 12, 13, 14, 17, and 1) and Hansa Yellow; magenta pigments, such as Brilliant Carmine 6B, Lake Red C, and Watching Red; cyan pigments, such as Phthalocyanine Blue, Phthalocyanine Green, and Alkali Blue; black pigments, such as carbon black; white pigments, such as titanium oxide; and metal powders, such as aluminum paste and bronze powder.

The content of the coloring component is about 1 to 30 mass % of the entire ink composition, for example, but may exceed this range. In preparation of a colored ink composition, another coloring component with a complementary color may be used, or an ink composition of another color may be added.

[Other Components]

The ink composition according to the present invention may contain other components as needed in addition to the components described above. Examples of such components include body pigments, resin components, polymerization inhibitors, dispersants, salts, such as phosphate salts, waxes, such as polyethylene wax, olefin wax, and Fischer-Tropsch wax, and alcohols.

The body pigments impart appropriate characteristics, such as printability and viscoelasticity, to the ink composition. A variety of body pigments usually used in the preparation of the ink composition can be used. Examples of the body pigments include clay, kaolinite or kaolin, barium sulfate, magnesium sulfate, calcium carbonate, silicon oxide or silica, bentonite, talc, mica, and titanium oxide. The amount of body pigments to be added is, for example, about 0 to 33 mass % of the entire ink composition, but may exceed this range.

The resin components impart appropriate characteristics, such as printability and viscoelasticity, to the ink composition. Examples of such resin components include a variety of resins used in printing ink compositions. Preferred are those having compatibility with the monomer and oligomer described above. Examples thereof include styrene-acrylic resin, acrylic resin, alkyd resin, rosin-modified phenol resin, rosin-modified maleic resin, rosin-modified alkyd resin, rosin-modified petroleum resin, rosin ester resin, petroleum resin-modified phenol resin, vegetable oil-modified alkyd resin, and petroleum resin.

The content of the resin component, if added, in the ink composition is preferably 1 to 30 mass %, preferably 1 to 20 mass %, more preferably 1 to 10 mass % because it can appropriately impart viscoelasticity to the ink composition to prevent misting, and ensure excellent curability of the ink composition.

Preferred examples of the polymerization inhibitors include phenol compounds (such as butylhydroxytoluene), tocopherol acetate, nitrosoamine, benzotriazole, and hindered amine. Among these compounds, more preferred is butylhydroxytoluene. Addition of the polymerization inhibitor to the ink composition can prevent an increase in viscosity of the ink composition caused by the polymerization reaction during storage. The content of the polymerization inhibitors in the ink composition is about 0.01 to 1 mass %, for example.

The dispersant is used to facilitate dispersion of the coloring component and the body pigments in the ink composition. A variety of dispersants are commercially available, such as DISPERBYK (trade name) series available from BYK Japan K.K.

The ink composition according to the present invention can be prepared by a traditionally known process using the components described above. An exemplary process involves mixing the components described above; kneading the mixture with a bead mill or a three-roll mill to disperse the pigments, i.e. the coloring component and the body pigment; adding one or more optional additives, such as a polymerization inhibitor, alcohol, and wax; and then adding the monomer component and/or the oil component to adjust the viscosity. The ink composition has a viscosity of, for example, 10 to 70 Pa·s measured at 25° C. with a Laray viscometer, but may have any viscosity beyond this range.

<Production of Printed Material>

The present invention also covers a method of producing printed material, the method involving printing using the active energy ray-curable ink composition for offset printing according to the present invention described above. The method of producing a printed material according to the present invention is performed using a standard offset lithographic technique except that the ink composition according to the present invention is used. The offset lithography used in this method may be of a wet printing type using dampening water, or a dry printing type which is performed using a dedicated lithographic printing plate without dampening water.

An undried printed material prepared by offset lithography is instantaneously dried through irradiation with active energy rays. This is implemented as a result of curing of the ink composition present on the surface of printing paper through irradiation with active energy rays. Known active energy rays, such as electron beams or UV light, may be used. The use of UV light is preferable from the viewpoint of installation cost and ease of operation. Because the ink composition according to the present invention has excellent curability even with a low-output UV light lamp, the ink composition is preferably used in energy-saving printing using a low output UV light lamp or an LED lamp. It should be understood that the resulting printed materials can be used not only for transmission of information or appreciation but also for other applications, such as packaging.

EXAMPLES

The present invention will now be described in more detail by way of examples, which should not be construed as limitation to the present invention. In the following description, "%" represents "mass %", and "parts" represents parts by mass unless otherwise specified.

[Preparation of Varnish]

A mixture of poly(diallyl phthalate) (available from OSAKA SODA CO., LTD., A-DAP) (20 parts by mass), ditrimethylolpropane tetraacrylate (DI-TMPTA) (79 parts by mass), and methylhydroquinone (1 mass %) was heated at 100° C. for 60 minutes to prepare a varnish. This varnish was used in preparation of ink compositions described below.

[Preparation of Ink Compositions]

The components, i.e., carbon black (available from Mitsubishi Chemical Corporation, MA-70), the varnish described above, trimethylolpropane triacrylate (TMPTA), ditrimethylolpropane tetraacrylate (DI-TMPTA), epoxidized soybean oil (available from ADEKA CORPORATION, O-130P, oxirane oxygen content: 6.9%), IRGACURE 907 (trade name, available from BASF SE, photopolymerization initiator), 4,4'-di ethylaminobenzophenone (EAB, photopolymerization initiator), soybean oil (in only Table 2), and linseed oil (in only Table 2) were mixed in the formulations shown in Tables 1 and 2, and were kneaded with a three roll mill to prepare ink compositions of Examples 1 to 7, Comparative Examples 1 to 6, and Referential Example 1. The numeric value indicating the amount of each ingredient shown in Tables 1 and 2 is represented in parts by mass. The states of the resulting ink compositions were examined. Those having excellent compatibility and having no precipitates are shown in Tables 1 and 2 with A in the column "Compatibility", and those having poor compatibility and having precipitates are shown in Tables 1 and 2 with F in the column "Compatibility". The ink compositions having precipitates were not subjected to the following evaluations because those were not usable in printing.

[Evaluation of Curability]

An ink composition is spread on a paper sheet, and its surface having the ink composition is irradiated with UV light. The UV light induces radical polymerization of the polymerizable compound having the ethylenically unsaturated bond contained in the ink composition to cure and dry the ink composition on the surface of the paper sheet. If insufficiently cured at this time, the ink composition on the surface of the paper sheet sinks into the inside of the paper sheet as time passes. This phenomenon is observed as a reduced surface concentration on the paper sheet and a reduced gloss accompanied by loss of surface smoothness over time. Each of the ink compositions of Examples, Comparative Examples, and Referential Example was spread on a paper sheet, and was cured. The difference between the surface concentration on the paper sheet immediately after the curing and after 24 hours had passed, and the gloss value after 24 hours from the curing were determined to evaluate the curability. In detail, an ink composition having excellent curability has a smaller difference in surface concentration on the paper sheet and a greater gloss value, and an ink composition having poor curability has a larger difference in surface concentration on the paper sheet and a lower gloss value. The evaluation was performed by the following procedure.

In each of the ink compositions of Examples, Comparative Examples, and Referential Example, 0.1 ml of ink composition was spread on a sheet of coating paper (available from Nippon Paper Industries Co., Ltd., Aurora Coat) using a rotary ink tester (two-divided roll, available from Akira Seisakusho, Ltd.), and was cured through irradiation with 40 mJ/cm$^2$ of UV light. The concentration immediately after the curing was measured with a SpectroEye concentration meter (available from GretagMacbeth GmbH). The sample was left in a room for 24 hours, and the concentration was re-measured. The concentration measured after 24 hours had passed was subtracted from the concentration measured immediately after the curing, and the difference was defined as a change in surface concentration. The results are shown in "Change in surface concentration (40 mJ/cm$^2$)" of Tables 1 and 2. The 60° reflection gross of the sample left in a room for 24 hours after the curing was determined using a Murakami digital gloss meter (available from MURAKAMI COLOR RESEARCH LABORATORY CO., LTD.). The results are shown in "Gloss (40 mJ/cm$^2$)" of Tables 1 and 2. The same evaluation was performed under 24 mJ/cm$^2$ of UV light, and the results are shown in "Change in surface concentration (24 mJ/cm$^2$)" and "Gloss (24 mJ/cm$^2$)" of Tables 1 and 2.

TABLE 1

| | Example 1 | Example 2 | Example 3 | Example 4 | Example 5 | Referential Example 1 |
|---|---|---|---|---|---|---|
| Carbon black | 22 | 22 | 22 | 22 | 22 | 22 |
| Varnish | 46 | 51.5 | 57 | 58 | 61.2 | 46 |
| TMPTA | | | | | | 10 |
| DI-TMPTA | 4 | 4 | 4 | 4 | 4 | 4 |
| Epoxidized soybean oil | 10 | 10 | 10 | 10 | 10 | |
| IRGACURE 907 | 12 | 8 | 4 | 4 | 2 | 12 |
| EAB | 6 | 4.5 | 3 | 1.5 | 0.8 | 6 |
| Total | 100 | 100 | 100 | 100 | 100 | 100 |
| Total amount (%) of initiators | 18 | 12.5 | 7.0 | 5.5 | 2.8 | 18 |
| Compatibility | A | A | A | A | A | A |
| Change in surface concentration (40 mJ/cm$^2$) | −0.03 | −0.03 | −0.03 | −0.08 | −0.16 | −0.04 |
| Change in surface concentration (24 mJ/cm$^2$) | −0.04 | −0.04 | −0.08 | −0.25 | −0.34 | −0.06 |
| Gloss (40 mJ/cm) | 43 | 43 | 42 | 40 | 41 | 36 |
| Gloss (24 mJ/cm) | 42 | 42 | 39 | 39 | 38 | 36 |

TABLE 2

| | Comparative Example 1 | Comparative Example 2 | Comparative Example 3 | Comparative Example 4 | Comparative Example 5 | Comparative Example 6 |
|---|---|---|---|---|---|---|
| Carbon black | 22 | 22 | 22 | 22 | 22 | 22 |
| Varnish | 51.5 | 57 | 58 | 61.2 | 49 | 49 |
| TMPTA | 10 | 10 | 10 | 10 | | |
| DI-TMPTA | 4 | 4 | 4 | 4 | 1 | 1 |

TABLE 2-continued

| | Comparative Example 1 | Comparative Example 2 | Comparative Example 3 | Comparative Example 4 | Comparative Example 5 | Comparative Example 6 |
|---|---|---|---|---|---|---|
| Soybean oil | | | | | 10 | |
| Linseed oil | | | | | | 10 |
| IRGACURE 907 | 8 | 4 | 4 | 2 | 12 | 12 |
| EAB | 4.5 | 3 | 1.5 | 0.8 | 6 | 6 |
| Total | 100 | 100 | 100 | 100 | 100 | 100 |
| Total amounts (%) of initiators | 12.5 | 7.0 | 5.5 | 2.8 | 18 | 18 |
| Compatibility | A | A | A | A | F | F |
| Change in surface concentration (40 mJ/cm$^2$) | −0.10 | −0.15 | −0.27 | −0.29 | | |
| Change in surface concentration (24 mJ/cm$^2$) | −0.14 | −0.22 | −0.36 | −0.36 | | |
| Gloss (40 mJ/cm) | 32 | 29 | 28 | 25 | | |
| Gloss (24 mJ/cm) | 30 | 28 | 24 | 22 | | |

Comparison of the ink compositions having the same total amount of the initiators in Examples and Comparative Examples shown in Tables 1 and 2 apparently shows that the change in surface concentration is smaller in those containing epoxidized soybean oil in Examples, and that the curability is improved. Comparison of the ink compositions in Example 3 and Referential Example 1 shows that 10 mass % epoxidized soybean oil added to the composition reduces the amount of the photopolymerization initiators to half or less. The results show that the ink composition in Example 1 irradiated with 24 mJ/cm$^2$ of UV light also has a similar curability to that of the ink composition in Referential Example 1 irradiated with 40 mJ/cm$^2$ of UV light. This indicates that the ink composition containing epoxidized soybean oil can be cured with a small dose of UV light.

The invention claimed is:

1. An active energy ray-curable ink composition for offset printing, comprising;
    a compound having an ethylenically unsaturated bond;
    a photopolymerization initiator; and
    an epoxidized fat or oil, wherein
    a viscosity of the ink composition is 10 to 70 Pa·s measured at 25° C. with a Laray viscometer.

2. The active energy ray-curable ink composition for offset printing according to claim 1, wherein the epoxidized fat or oil is contained in an amount of 1 mass % to 50 mass % of the entire composition.

3. The active energy ray-curable ink composition for offset printing according to claim 1, wherein the epoxidized fat or oil is epoxidized soybean oil.

4. A method of producing printed material, comprising printing using the active energy ray-curable ink composition for offset printing according to claim 1.

5. The active energy ray-curable ink composition for offset printing according to claim 2, wherein the epoxidized fat or oil is epoxidized soybean oil.

6. A method of producing printed material, comprising printing using the active energy ray-curable ink composition for offset printing according to claim 2.

7. A method of producing printed material, comprising printing using the active energy ray-curable ink composition for offset printing according to claim 3.

* * * * *